United States Patent [19]

Standing

[11] Patent Number: 4,755,633
[45] Date of Patent: Jul. 5, 1988

[54] FENCEWIRE HAVING AN ELECTRICALLY CONDUCTIVE SHEATHING

[76] Inventor: Colin A. Standing, 6 Buckland Place, Cambridge, New Zealand

[21] Appl. No.: 923,322

[22] Filed: Oct. 27, 1986

[30] Foreign Application Priority Data

Oct. 29, 1985 [NZ] New Zealand ............... 213994

[51] Int. Cl.⁴ .................. A01K 3/00; H01B 5/02; H01B 5/16
[52] U.S. Cl. .................. 174/133 R; 174/126 CP; 256/4; 256/10
[58] Field of Search ........... 174/68 R, 102 SC, 110 R, 174/119 R, 119 C, 120 SC, 126 R, 126 CP, 127, 129 R, 133 R; 256/4, 10, 32, 46, 49; 428/332, 339, 368, 379, 389, 397

[56] References Cited

U.S. PATENT DOCUMENTS

| 3,980,277 | 9/1976 | Enoksson | 256/10 |
| 4,383,133 | 5/1983 | Lanfranconi | 174/127 |
| 4,465,263 | 8/1984 | Robbins, Jr. | 256/49 X |
| 4,533,120 | 8/1985 | Ruddock | 256/10 X |

*Primary Examiner*—Laramie E. Askin
*Attorney, Agent, or Firm*—Abelman Frayne Rezac & Schwab

[57] ABSTRACT

Fence wires for the confinement of stock animals, zoo animals or wild animals have an electrically conductive synthetic plastic sheath and a tension resisting core which is made of either a textile material or a fence wire. The sheath is rendered conductive by the incorporation of amino compounds which are vulcanised with the chloropolymers of the sheath material, by the incorporation of metallic hairs or conductive plasticizers.

5 Claims, 1 Drawing Sheet

FENCEWIRE HAVING AN ELECTRICALLY CONDUCTIVE SHEATHING

FIELD OF THE INVENTION

This invention concerns fence wire, especially electrically conductive fence wire.

BACKGROUND OF THE INVENTION

A wire for electric fencing should be conductive, easily visible, easily handled such that it may be conveniently wound onto or off a reel and the wire should be such that it can be readily connected to a power source.

Naked wire presently favoured for use in electric fencing suffers from an important drawback in relation to stock and horses in particular. Although it can be wound onto a small diameter reel, it is poorly visible, especially in the failing light of overcast weather. Dust, rain and mist all reduce the visibility and where horses are confined, particularly racing and breeding animals, the prevention of injury through collision with the fence is of utmost importance to the owners. Collisions at speed between horses and fence wire are not uncommon and the small diameter of the fence wire added to the tension under which it is installed tends to produce laceration or bruising in the animal.

One produce which seeks to improve visibility consists of a strip of sheet aluminum about 100 mm wide with each of the two longitudinal edges rolled over to enclose a separate tensile steel wire. The pair of wires are stapled to wooden fence posts. The strip is enamelled in white and is much more visible than individual fence wires but was not electrifiable since the whole strip was conductive and insulation at the post was a problem. More serious was the impossible of installing the product over undulating ground because the rigidity of the strip precluded adaptation to contour.

Multi strand wires consisting of plastic monofils and metal strands are more easily visible and more easily handled; for example, they can be wound onto a reel but because of the different characteristics of the metal and plastic strands, the conductive metal strands are often broken after periods of use. Further, because the metal strands are exposed, contact between wire and fence standards or other objects will cause short circuiting.

A sheet plastic ribbon has been tested for fixing to an electrifiable fence wire. This ensured good visibility but was subject to tatter by wind and the product was not easily incorporated into a reel windable version. Accordingly, the technical problem of achieving electrical conductivity and visibility remained.

SUMMARY OF THE INVENTION

This invention provides a fence wire characterised by an electrically conductive, extrudable synthetic plastic sheath which renders the fence wire easily visible in use and a core of a material capable of withstanding fencing tension.

The sheath preferably is of a colour which contrasts with the background and which shows up well in low intensities of light. White, yellow and orange are useful in this regard. Yellow and black stripe is also useful but white is preferred overall.

There are various ways of making the sheath electrically conductive. The incorporation of carbon black is to be avoided firstly since it can prevent the attainment of a suitable sheath colour. Secondly, it does not produce uniform conductivity. The incorporation of very small diameter chopped wires into the sheath material is effective because the sheath is only 1–5 mm thick but it is possible for one end of a wire inclusion to touch the fence wire running through the centre of the sheath while the other end lies exposed on the surface of the sheath. Even so, the resulting sheath still displays gaps where no shock is experienced by touching. These gaps are not large but stock animals may eventually learn where they are and the effectiveness of the fence is reduced somewhat.

The use of conductive plasticizers is possible but these do not always achieve permanent conductivity and may even disturb the stability of the sheath material.

Urethanes may be rendered conductive by the incorporation of quaternary ammonium salts but the resistivities are still comparatively high. These, however, require solvent systems to place the compounds in solution and thus the milling of the sheathing material is not straightforward. It is preferred to make the sheath material from a halogenated polymer and to incorporate a polyfunctional tertiary amino compound. The preferred amino compounds are those which can be mixed homogeneously with the polymers to achieve uniform conductivity. The mixtures can be self-vulcanising under normal vulcanising conditions so that cross-linking agents are not essential. Polyfunctional aliphatic tertiary amines, thiocarbamates, thiurams and substituted thioureas are utilisable if the polymer has a reactive halogen preferably Cl or Br or a reactive halogen containing group for example chlorosulphonyl.

The amino compounds include:
N,N,N′,N′-tetramethyl-1,3-butanediamine,
N,N,N′,N′-Tetramethylethylenediamine,
Tetramethylthiuram monosulfide,
Tetramethylthiuram Disulfide,
Tetraethylthiuram Disulfide,
Tetrabutylthiuram Disulfide,
Bismuth dimethylthiocarbamate,
Cadmium dimethyldithiocarbamate,
Copper dimethyldithiocarbamate,
Zinc dimethyldithiocarbamate,
Zinc dibutyldithiocarbamate, and
Trimethylenethiourea.

The polymers include polychloroprenes, chlorinated polyvinyls, bromobutyl, chlorobutyl, chlorosulphonated polyethylene, blends of chlorinated polyethylene-chloroprene and blends of epichlorohydrin-chloroprene. The addition of 1–15 parts of amino compound to 100 parts of polymer is adequate to give conductive sheath material.

DESCRIPTION OF THE DRAWINGS

Various embodiments of the invention are now described with reference to the drawings in which.

DESCRIPTION OF THE EMBODIMENTS

Figure 1:
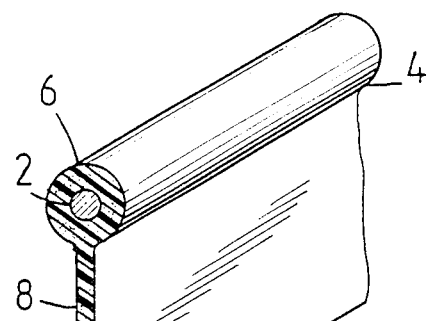
FIG. 1 is a cross sectional perspective view of a short length of sheathed fence wire.
Figure 2:
FIG. 2 is a cross sectional perspective view of a second form of sheathed fence wire.

Referring now to FIG. 1, the core 2 is made of steel fence wire of 2.5 mm diameter. A sheath 4 surrounds the wire consisting of a bead 6 of circular cross-section and a flange 8 extending from the bead. The thickness of the bead wall is equal to the thickness of the flange; namely, 3 mm. The flange is 8 mm wide. The sheath is made of a bright yellow extrudable synthetic plastic commercially available under the trade mark BECKI-SHIELD. Electrical conductivity in this mix is achieved by inclusion of metal strands rather than by the use of conductive fillers such as carbon. In FIG. 2 the wire is carried in the centre of the sheath surrounded by a bead 6 from which extend a pair of flanges 10. The flanges taper in thickness from the bead to the tips. Overall the width of the sheath is 10 mm. The resistivity is found to be up to 10,000 ohm cm.

Figure 3:
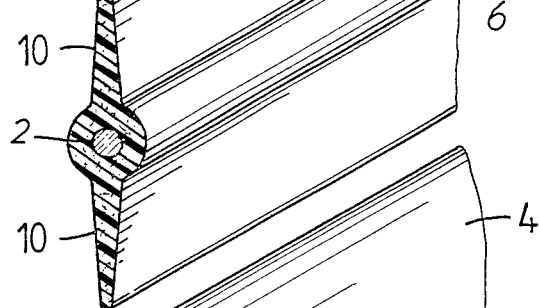
FIG. 3 is a cross sectional perspective view of a third form of sheathed fence wire.

In FIG. 3 the wire is carried at the centre of a sheath of elliptical configuration. During installation the sheath may rotate, presenting a barrier of differing width, but this is not in practice a disadvantage because some of the sheath will always be presented face on to the stock and its full width is much more visible than a fence wire.

Figure 4:
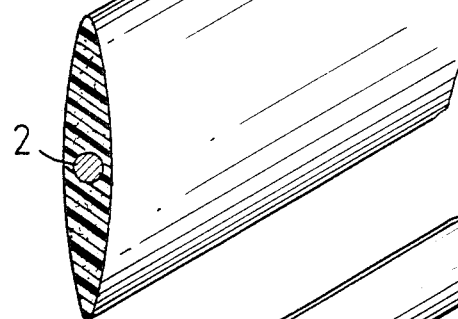
FIG. 4 is a cross-sectional perspective view of a fourth form of sheathed fence wire.

In FIG. 4 the sheath is of circular cross-section. This uses more sheath material but is the easiest to install.

The sheath is mounted in insulators which are fixed to fence posts and the wire is tensioned as required. It does not matter is the sheath is damaged as by chewing when the power is switched off or is cut accidently, providing the core is electrically conducting.

Figure 5:
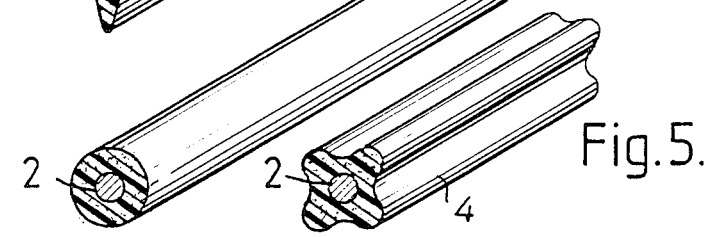
FIG. 5 is a cross-sectional perspective view of a fifth form of sheathed fence wire.

In FIG. 5 the sheath material is of almost square cross section, the wire to sheath surface distance being about 1.0-1.5 mm. This conductive sheath material is made by milling 100 parts of chloroprene, 1 part stearic acid, 5 parts carbon black, 40 parts white colloidal silica and 3 parts of N,N,N',N'-tetramethyl-1,3-butanediamine until a uniform mix is obtained. The mix is off white in colour. The material is then extruded around a galvanised fence wire and the product is vulcanised for 12 hours at 300° F.

The advantages of the above embodiments have been found to be;

1. That the fence wire is electrically conductive throughout its length causing animals to be reluctant to chew or lick the fence wire.
2. The wire can easily be wound on a reel.
3. Excellent visibility due to the light contrasting colours of the sheath and the width of the sheath being greater than the diameter of the fence wire.
4. It is easy to provide insulated mounts for the wire on the fence posts.
5. Installation over undulating ground presents no problem.

I claim:

1. Fencewire having an electrically conductive outer sheathing, comprised by:

a continuous electrically conductive metal wire core of sufficient thickness to withstand axial tension exerted thereon during the installation and use of said fencewire and providing the major stress-bearing structure of said fencewire; and, an extruded sheathing of an electrically conductive synthetic plastic material surrounding said core wire and in continuous electrical contact therewith;

said sheathing extending longitudinally of a longitudinal axis of said core wire, and extending radially of said longitudinal axis of said core wire in at least one direction radially of said core wire in ribbon form by a distance of at least three to twenty times the diameter of said core wire in that radial direction;

whereby, said electrically conductive sheathing is of a transverse dimension appreciably in excess of the thickness of said core wire, and provides a readily observable visual warning to persons and animals of the presence of said fencewire.

2. The fencewire of claim 1, in which said ribbon form extension of said sheathing extends in a single direction radially of said core wire, and said core wire is positioned adjacent one longitudinal edge of said sheathing.

3. The fencewire of claim 1, in which said ribbon form extension of said sheathing extends in opposite directions diametrically of said core wire, and said core wire is positioned substantially centrally of said sheathing.

4. The fencewire of claim 1, including a plurality of said ribbon form extensions of said sheathing extending radially of said core wire at positions spaced angularly relative to each other.

5. The fencewire of claim 4, in which said ribbon form extensions are arranged in cruciform arrangement.

* * * * *